United States Patent
McKinley et al.

(10) Patent No.: US 6,565,296 B2
(45) Date of Patent: May 20, 2003

(54) DRILL INSERT GEOMETRY HAVING CHIP SPLITTING GROOVE

(75) Inventors: Robert McKinley, Akron, OH (US); Joseph P. Nuzzi, Dover, OH (US); Timothy G. Stokey, Dover, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 0 days.

(21) Appl. No.: 09/999,544

(22) Filed: Oct. 23, 2001

(65) Prior Publication Data

US 2002/0141839 A1 Oct. 3, 2002

Related U.S. Application Data

(60) Provisional application No. 60/279,518, filed on Mar. 28, 2001.

(51) Int. Cl.$^7$ ................................................ B23B 51/02
(52) U.S. Cl. .................... 408/224; 408/230; 408/233; 408/713
(58) Field of Search .............................. 408/223, 224, 408/227, 230, 233, 713

(56) References Cited

U.S. PATENT DOCUMENTS

| | | | | |
|---|---|---|---|---|
| 85,107 A | * | 12/1868 | Count ......................... | 408/224 |
| 496,253 A | * | 4/1893 | Federschmidt ............... | 408/59 |
| 1,221,247 A | * | 4/1917 | Traylor ....................... | 408/224 |
| 2,646,701 A | * | 7/1953 | Letien ......................... | 408/56 |
| 3,333,489 A | * | 8/1967 | Mossberg .................... | 408/60 |
| 3,460,409 A | | 8/1969 | Stokey | |
| 4,060,335 A | * | 11/1977 | Holloway et al. .......... | 408/233 |
| 4,115,024 A | * | 9/1978 | Sussmuth .................... | 407/114 |
| 4,355,932 A | * | 10/1982 | Koppelmann et al. ...... | 408/188 |
| 4,984,944 A | * | 1/1991 | Pennington, Jr. et al. ... | 408/223 |
| 5,154,549 A | | 10/1992 | Isobe et al. | |
| 5,160,232 A | * | 11/1992 | Maier ......................... | 408/223 |
| 5,228,812 A | | 7/1993 | Noguchi et al. | |
| 5,957,635 A | | 9/1999 | Nuzzi et al. | |
| 6,135,681 A | | 10/2000 | Nuzzi et al. | |

FOREIGN PATENT DOCUMENTS

| | | | |
|---|---|---|---|
| EP | 0 278 288 A | 8/1988 | |
| EP | 0 508 468 A | 10/1992 | |
| GB | 550306 | 1/1943 | |
| JP | 15907 | * 2/1981 | ................. 408/233 |

OTHER PUBLICATIONS

PCT International Search Report for International Application No. PCT/US/02/08825 Aug. 5, 2002.

* cited by examiner

*Primary Examiner*—Daniel W. Howell
(74) *Attorney, Agent, or Firm*—Robert J. Clark; Hahn Loeser & Parks, LLP

(57) ABSTRACT

The present invention provides a novel drill insert having chipbreakers, or chip splitting grooves formed through the cutting surfaces. The cutting tool insert has a specialized geometry including a chip splitting groove formed at a negative rake angle. The chip splitting grooves increase the cutting efficiency of the tool while allowing the edge strength to be increased while also allowing higher feed rates.

21 Claims, 5 Drawing Sheets

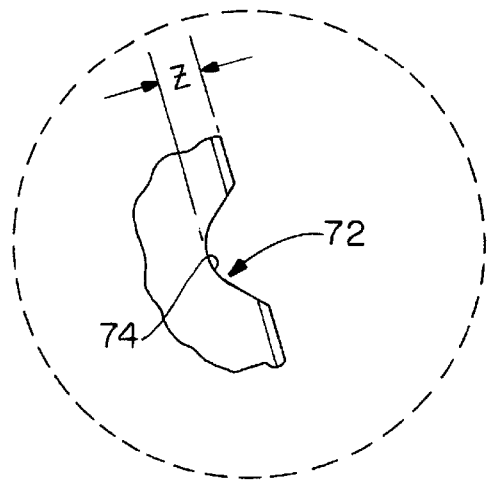
FIG.-4D
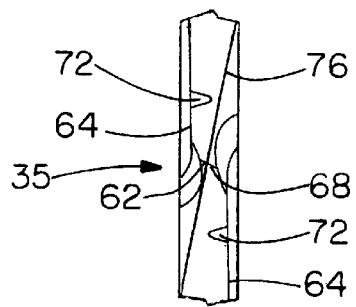
FIG.-4E
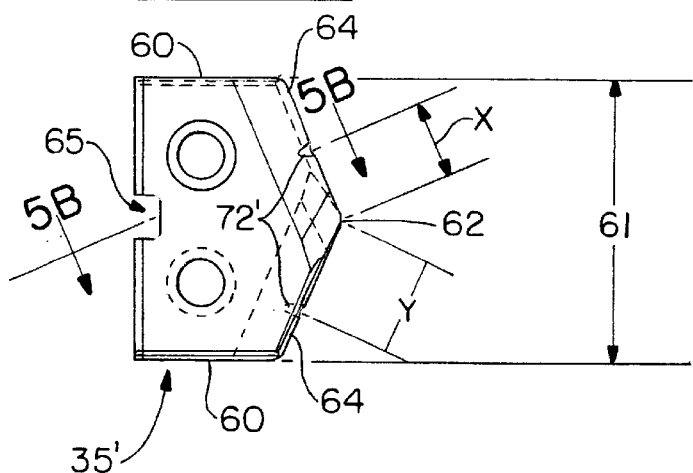
FIG.-5A
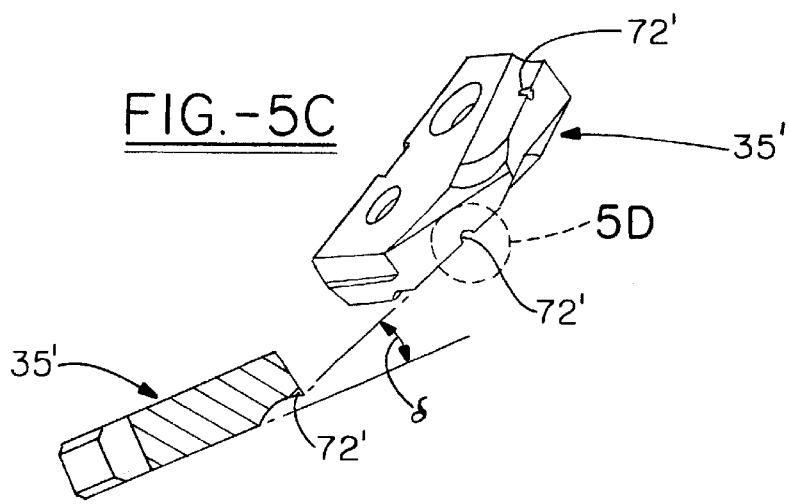
FIG.-5C
FIG.-5B

DRILL INSERT GEOMETRY HAVING CHIP SPLITTING GROOVE

This application claims benefit of Prov. Appl. Ser. No. 60/279,518 filed Mar. 28, 2001.

TECHNICAL FIELD

The invention relates generally to a cutting insert to be placed into a tool holder for boring holes into metals. More specifically the invention relates to a cutting tool insert having a specialized geometry including a chip splitting groove formed at a negative rake angle on the cutting surface allowing increased strength and higher feed rates.

BACKGROUND OF THE INVENTION

Drilling systems are frequently used to provide cylindrical holes in metallic workpieces. The cutting or boring action of the drill system may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, the tool and workpiece may be made to rotate relative to one another. The use of cutting inserts allows for quick changing of the insert upon wear of the cutting surfaces instead of the entire tool, and allows for one tool to be used for a variety of different boring applications by simply changing the insert and not the entire drill assembly.

One problem with prior art cutting tools is that oftentimes improvements to the insert to increase cutting efficiency also reduce the insert strength. An example is the use of chipbreakers which are typically formed parallel to the clearance on the back side of the cutting edge. Referring to FIG. 1, a typical prior art spade type insert 2 is shown in a cross-sectional view taken through the center of a chipbreaker 4 formed through the cutting edge 6 of the insert 2. Behind the cutting edge 6, the primary clearance 8 drops down at an angle α from the horizontal. The clearance prevents unwanted contact between the work piece and the insert 2. The prior art insert 2 also comprises a secondary clearance 9 formed at an angle θ from the horizontal, which is larger than angle α, creating additional clearance. The dual angled clearance surfaces 8, 9 allow more material behind the cutting edge 6 than a clearance formed solely at the secondary clearance angle θ, and more clearance than that provided by the primary clearance angle α. Chipbreaker 4 is shown formed at an offset distance D, parallel to primary clearance angle α. Due to the secondary clearance angle θ, chipbreaker 4 breaks through the clearance surface of the insert 2 at point P. Although not shown, there will also be a breakout point P if the chipbreaker is not formed parallel to the clearance angle α, but rather at a smaller angle down from the horizontal than clearance angle α. Although also not shown, prior art chipbreakers can also extend across the entire width W of the insert 2. The removal of material across the width of the insert, or a significant portion of the width of the insert, can significantly reduce the insert strength. This is especially true with inserts made of sintered metallic hard materials which are generally more brittle than other materials. Typical sintered hard materials include carbide, cermet, ceramic, monocrystalline and polycrystalline diamond, boron nitride, etc.

SUMMARY OF THE INVENTION

The present invention provides a novel drill insert having chipbreakers formed on the cutting surfaces. The chipbreakers increase the cutting efficiency of the tool while allowing the edge strength to be increased. The drill insert of the present invention allows higher feed rates. These and other objects of the invention will be apparent as disclosed in the detailed description of the drawings below.

BRIEF DESCRIPTION OF THE DRAWINGS

The invention and developments thereof are described in more detail in the following by way of embodiments with reference to the drawings, in which:

FIGS. 4A, 4B, 4C, 4D, and 4E are a variety of different views of an insert according to a first embodiment of the present invention having a chip splitter formed at a large negative rake angle; and FIGS. 5A, 5B, 5C, 5D, and 5E are a variety of different views of an insert according to a second embodiment of the present invention having a chip splitter formed at a small negative rake angle.

DETAILED DESCRIPTION OF THE INVENTION

Figure 2:
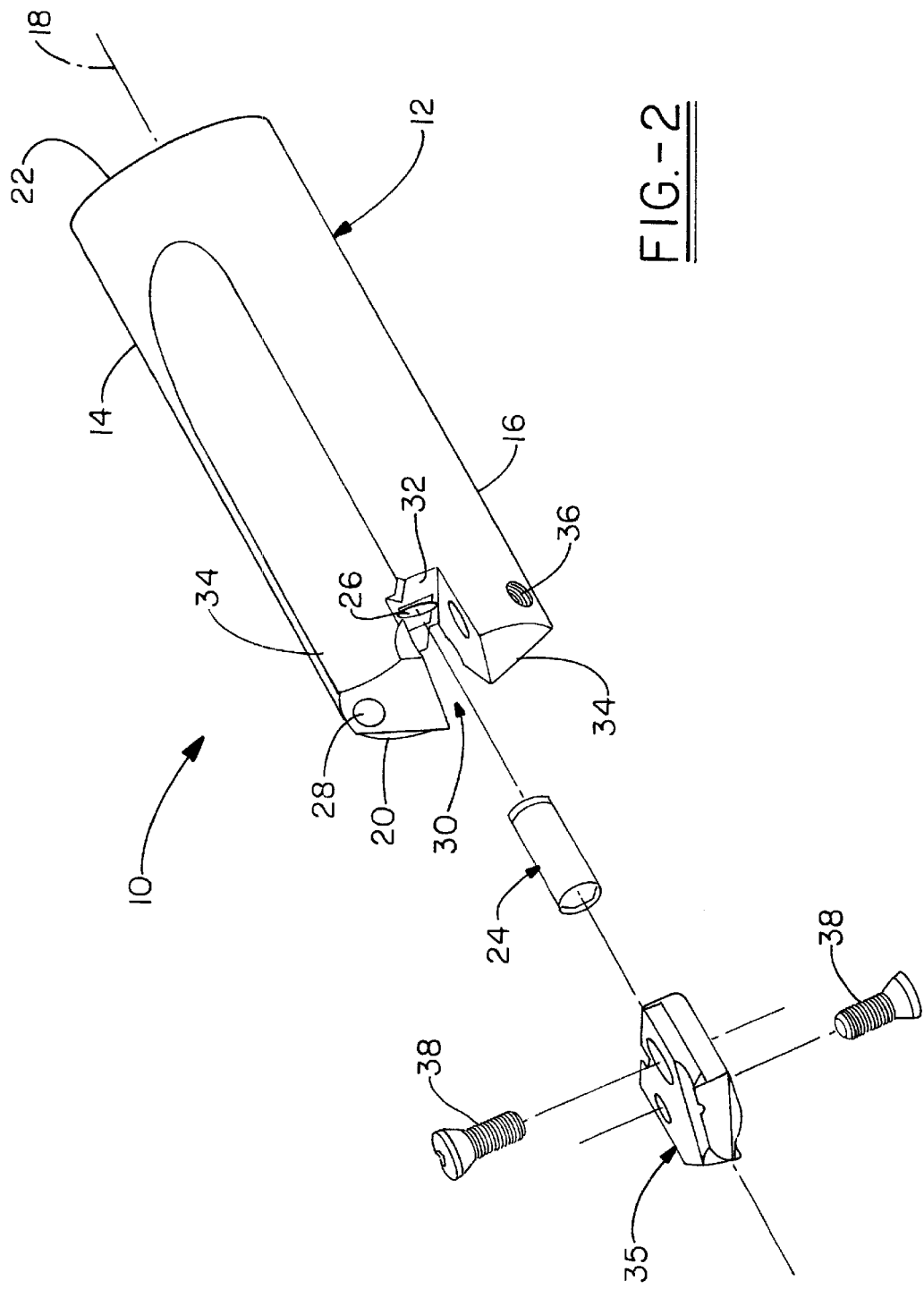
FIG. 2 is an exploded assembly view of the drill tool assembly of the present invention.
Figure 3:
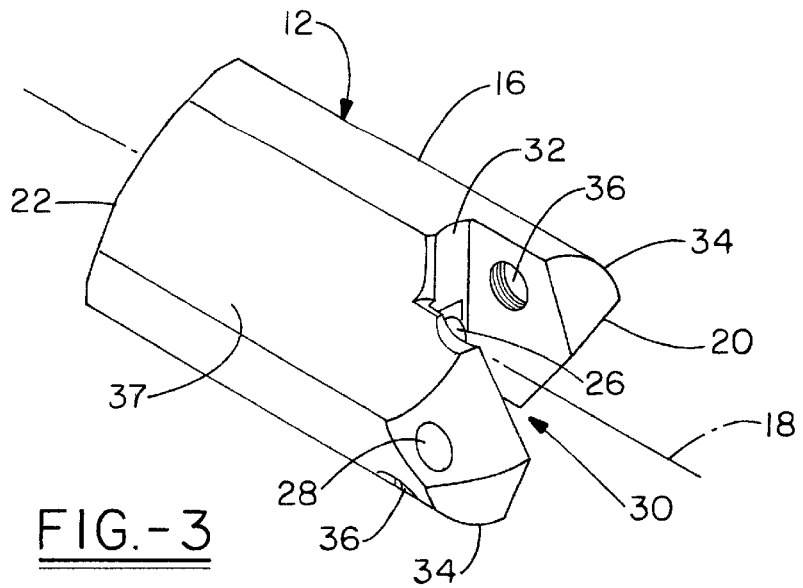
FIG. 3 is a partial perspective view of the holder associated with the assembly shown in FIG. 2.

Turning now to a preferred embodiment of the invention, FIG. 2 illustrates a drill tool assembly 10 generally indicated. Drill tool assembly 10 comprises a holder 12, which has a shank 14 and head portion 16 associated therewith. In the preferred embodiment, holder 12 has, in general, a cylindrical shape with a first end 20 and second end 22 with the second end 22 and portion of shank 14 adapted to be fixedly attached in a drilling machine for use. As shown in FIG. 3, the first end 20 of holder 12 has a clamping or holder slot 30, which may extend across the entire diameter of the head portion 16 or, at least, over a center portion thereof at the general location of the rotational axis 18 of holder 12. The holder slot 30 has a bottom wall 32 positioned in substantially perpendicular orientation relative to the rotational axis 18 of the holder 12. In the preferred embodiment, the assembly 10 may further include a locating boss or dowel pin 24, which is positioned precisely with respect to the axis 18 and extends from the bottom wall 32 of the holder slot 30. The pin 24 may be positioned within a hole 26 extending downwardly from the bottom wall 32 of slot 30 along the axis 18 of the holder body in a press fit relationship to position pin 24. Alternatively, the locating boss, which, in the preferred embodiment, comprises pin 24, may be configured in another manner to achieve the corresponding functionality of pin 24, such as an integral member extending from bottom wall 32. Within the holder slot 30, a drill insert 35 of the present invention is precisely positioned with respect to the holder 12 to perform the desired drilling function in conjunction therewith. As will be hereinafter described in more detail, the drill insert 35 of the present invention (shown in detail in FIGS. 4 and 5) has a point geometry comprising a plurality of cutting surfaces which are precisely positioned with respect to the axis 18 of the holder 12 to minimize errors in drilling operation using assembly 10.

More particularly, the preferred embodiment of holder 12 is shown in FIG. 3, and may be configured to include at its first end 20 a pair of clamping arms 34, which extend about holder slot 30. The clamping arms 34 preferably include apertures 36, which accommodate screws 38 (see FIG. 2) to secure the drill insert 35 in its position within the holder slot 30. In the preferred configuration, the holes 36 are threaded to engage screws 38, and mate with screw holes formed in the drill insert 35 in a predetermined manner to precisely locate the drill insert in a predetermined location within holder slot 30, as will be described in more detail. Each of the clamp arms 34 may also include a lubrication vent 28, which allows the application and flow of lubrication adjacent the cutting surfaces of the drill insert to facilitate the drilling operation. The clamp arms 34 may also include angled or curved surfaces, which facilitate chip removal via chip evacuating grooves 37 on each side of the holder 12. The seating surface 32 is also shown to be designed as a planar surface, which corresponds to the planar bottom portion of the preferred drill insert 35, although another configuration of bottom surface 32 may be employed and is contemplated herein.

Figure 4A:
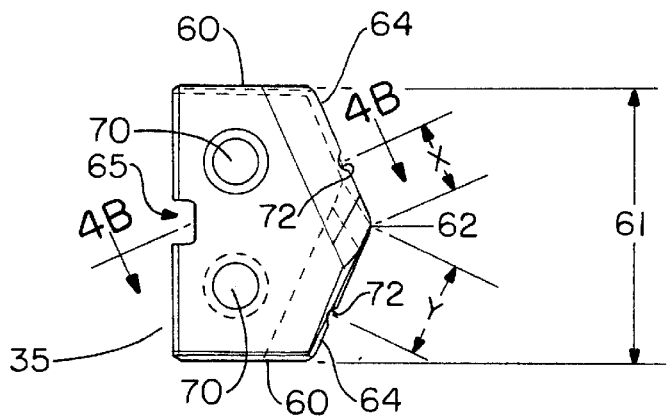
Figure 4B:
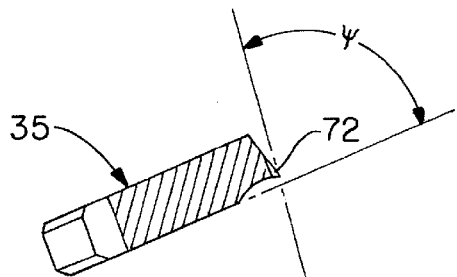
Figure 4C:
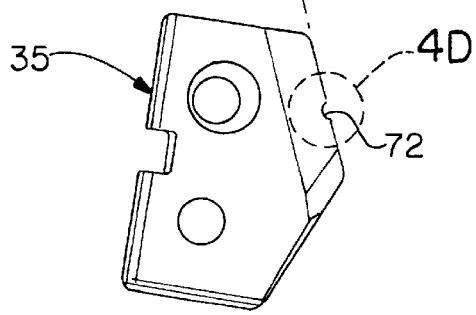

Turning to FIG. 4A, a first embodiment of the drill insert 35 is shown. The drill insert 35 may form a spade drill blade, with lands or side edges 60 of the blade being generally parallel with the rotational axis 18 of the holder 12 once the insert 35 is positioned and secured with holder 12. When secured with holder 12, drill insert 35 will also have a rotational axis which desirably is coaxial with axis 18 of holder 12. The drill insert 35 will also have a width 61 which upon being rotated with holder 12 forms an outside diameter of the assembled tool. The drill insert 35 further includes cutting edges 64 on its upper surface in the form of an obtuse V-shape, with cutting edges 64 on each side of the axial center 62. The cutting edges 64 may include a plurality of cutting components which cooperate together to provide the desired cutting surface 64 for the material and/or drilling application. In general, the insert 35 is designed to cut when rotationally driven in conjunction with holder 12 in a predetermined direction, and is not reversible, although such drilling blade configurations are known to those skilled in the art and could be used in conjunction with the present invention if desired. The drill insert 35 further preferably includes apertures 70 which cooperate with the apertures 36 in clamp arms 34 to secure insert 35 within holder slot 30 and seated against seating surface 32. Additionally, insert 35 includes a locating slot 65 which allows positioning of the locating pin 24 therein.

Figure 1A:
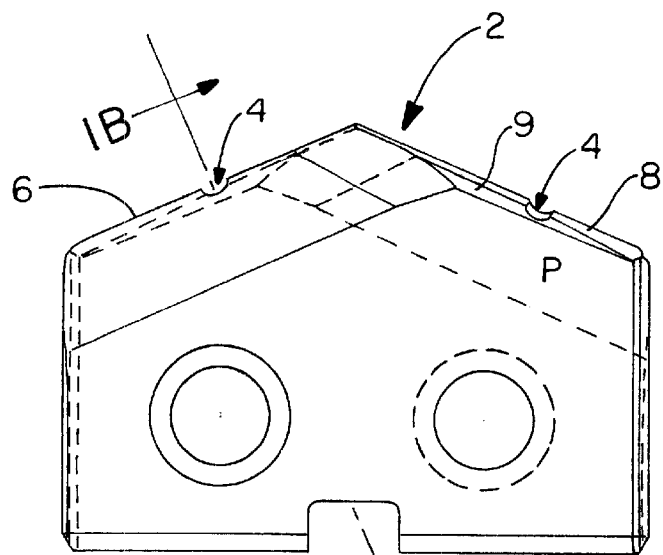
FIG. 1A is plan view of a prior art insert having a typical chipbreaker formed parallel to the primary clearance angle.
Figure 1B:
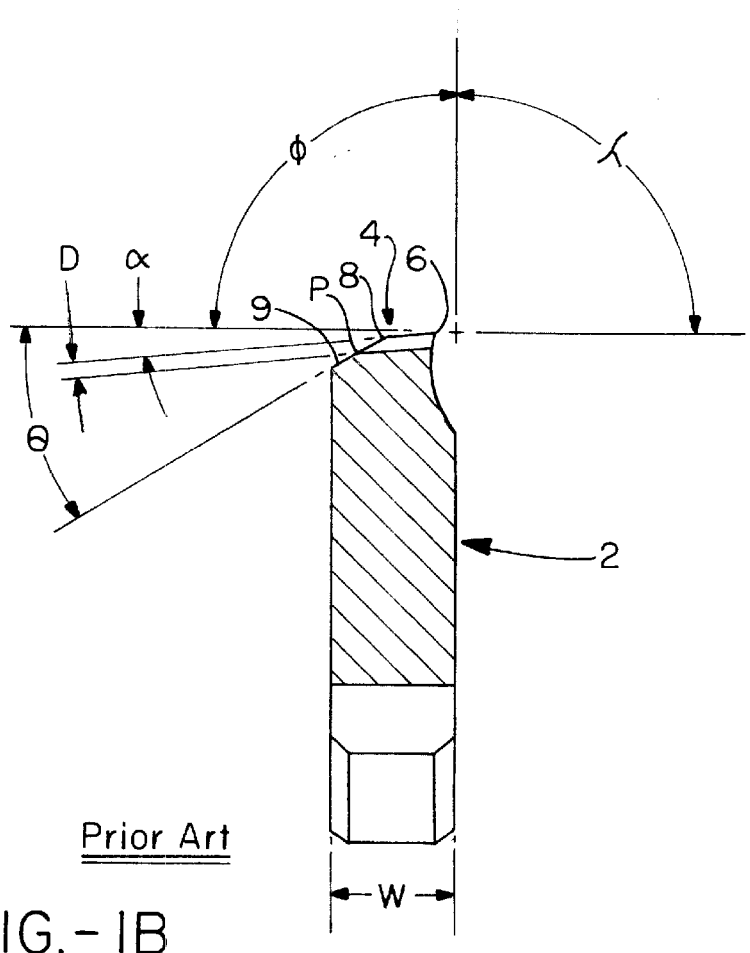
FIG. 1B is a cross-sectional view through the chipbreaker of a prior art insert having a typical chipbreaker formed parallel to the primary clearance angle

In the present invention, the cutting edges 64 include at least one chipbreaker, or chip splitter 72 formed thereon as that shown in FIGS. 4b–4e. Unlike the prior art chipbreakers formed at clearance angles below the horizontal, chip splitter 72 is formed at a negative rake angle ψ, shown herein at approximately an 80 degree angle from the vertical. The rake angle is generally defined as the angle of the tool with respect to the cutting direction. As best shown in FIG. 1, a negative rake angle is any angle φ between the horizontal (leading into the clearance angle) and left of the cutting edge vertical (neutral cutting angle) and a positive rake angle is any angle λ between the horizontal and right of the vertical (neutral cutting angle). Chip splitter 72 acts as a recess portion along cutting edge 64 such that chip splitter 72 acts to disconnect the linear surface of cutting edge 64. Chip splitter 72 is best shown in FIG. 4d as being v shaped having a radius at the apex 74. As previously mentioned, the prior art chipbreakers are generally formed at a clearance angle such that only the chipbreaker surfaces on the cutting edge are able to cut the work piece. In the present invention, chip splitter 72 is formed at a negative rake angle ψ such that not only are that chip splitter surfaces on the cutting edge available to cut the work piece, the edges of the chip splitter formed on the clearance surface also cut the work piece.

Each chip breaker 72 is located at different radial distances X, Y, along cutting surface 64 from dead center 62 of the insert 35. This enables material left from a chip splitter 72 on one side of insert 35 to be removed by the next sweep of the cutting surface 64 on the opposite side of insert 35. The formation of chip splitter 72 is directly related to the feed rate of the tool. In order to assist in the splitting of chips, it is desirable that the depth Z of chip splitter 72 (as best shown in FIG. 4D) is greater than the feed rate of the tool. This ensures that at least the apex 74 portion of the chip splitter 72 on each side of the insert 35 is not removing any metal during its sweep, in effect creating a discontinuity resulting in narrower chips along cutting surface 64. The sides of the chip splitter 72 leading toward apex 74 form a cutting edge which cuts the ends of the chips formed on either side of apex 74 during cutting operations. If depth Z of chip splitter 72 is less than the feed rate of the tool, the entire cutting surface 64, including chip splitter 72, is removing material thereby creating a large continuous chip formed across cutting surface 64.

Figure 5D:
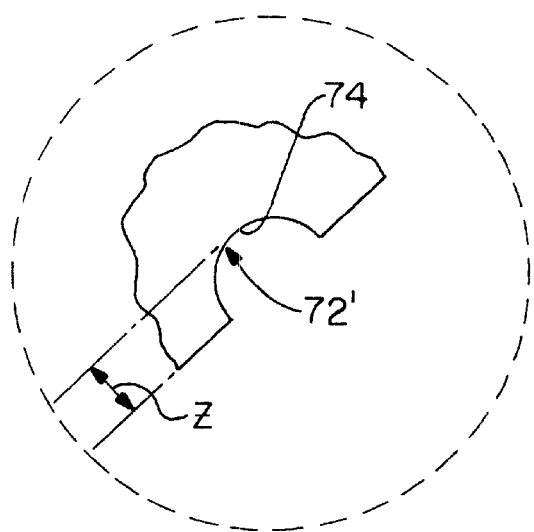

In a second embodiment as best shown in FIG. 5D, chip splitter 72' is formed at a small negative rake angle δ, shown herein at approximately a 20 degree angle from the vertical. Chip splitter 72' is also formed as a full radius having an apex depth Z. As chip splitter 72' is formed at such a small rake angle 6, the operation of the chip splitting formation is different than in the previous embodiment. With apex 74 depth Z being so shallow, chip splitter 72' cuts along its entire profile such that the entire chip splitter forms a cutting edge. Therefore, rather than splitting the chip due to the discontinuity of the cutting edge 64, chip splitter 72' splits the chips due to an excessive material strain rate created inside the chip splitter confinements by the chip splitter 72' geometry.

It is contemplated that chip splitters 72, 72' can be formed with different cross-sectional shapes and are not limited to a particular cross-section shown herein. Additionally, it is contemplated that chip splitters 72, 72' can be formed at any negative rake angle and are not limited by the examples of 20 degrees and 80 degrees shown herein, although there may be a preference of angles in the ranges of 10–30 degrees and 65–85 degrees. While a negative angle is typically associated with deforming a metal rather than cutting by shear, in the preferred embodiments shown herein, chip splitter 72, 72' is formed at a high position below or above the center line such that they are in effect shearing the metal with a more positive effective rake angle.

The use of chip splitter 72, 72' also enables higher edge strength along critical corners of insert 35 in comparison to prior art chipbreakers which are typically formed normal to the cutting edge and such that the chipbreaker grooves extend the entire width of the insert. This prior art practice removes a significant amount of material and creates somewhat sharp corners creating potential high stress weak spots. Chip splitters 72, 72' are angled such that their depth decreases with distance from cutting edge 64 and disappearing generally before reaching the midpoint of the insert width. Increased material strengthens the cutting edge. The removal and/or strengthening of corners also strengthens the cutting edge 64 and the insert 35 in general. While the negative rake angles of chip splitter's 72, 72' may increase tool forces to some extent, this minor disadvantage is offset by the added support to the cutting edge. These factors combine in the insert 35, 35' of the present invention to allow increased feed rates, higher penetration, higher speeds, and longer life. The chip splitters 72, 72' reduce the chip width, thus facilitating their removal from the drilled hole.

Figure 5E:
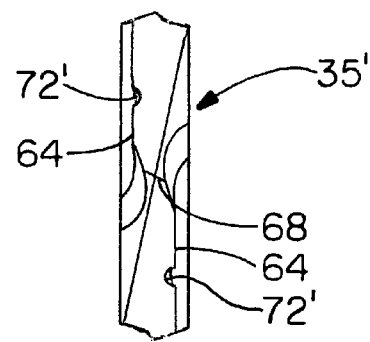

The chip splitters are shown used with an insert having a self centering configuration, as best shown in FIGS. 4E and 5E, wherein a four-faceted chisel point 68 is shown on a drill insert 35, 35'. Chisel 68 is created by a diagonal clearance cut 76 extending through the center point 62 of chisel 68 from each trailing edge corner. The diagonal clearance cut 76 increases the strength of the insert 35 by removing less metal than a clearance cut formed parallel to the cutting surface 64 as in prior art inserts. It is noted that the present invention is not limited to use with such configurations.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A drill insert comprising:
    a drill insert body having at least one cutting edges; and
    a chip splitting groove formed transverse to the cutting edge;
    wherein the chip splitting groove is formed at a negative rake angle.

2. The drill insert of claim 1, wherein the chip splitting groove is formed at a negative rake angle and the negative rake angle is an acute angle between a neutral angle and a clearance angle.

3. The drill insert of claim 1, wherein the chip splitting groove is formed at a negative rake angle selected from the group consisting of 10–30 degrees and 65 to 85 degrees.

4. The drill insert of claim 1, wherein the drill insert body is comprised of a sintered metallic hard material.

5. The drill insert of claim 1, wherein the drill insert body is comprised of a material selected from the group consisting of carbide, cermet, ceramic, monocrystalline and polycrystalline diamond, and boron nitride.

6. The drill insert of claim 1, wherein the drill insert body is comprised of high speed steel.

7. The drill insert of claim 1, wherein the chip splitting groove has a cross-sectional geometry in the form of a continuous radius.

8. The drill insert of claim 1, wherein the chip splitting groove has a cross-sectional geometry in the form of a radius at the apex of the groove and transitioning to straight side walls toward the cutting edge of the insert.

9. The drill insert of claim 1, wherein the drill insert body further comprises at least one clearance surface trailing each cutting edge such that a trailing portion of the chip splitting groove lies in the plane of the at least one clearance surface and a leading portion of the chip splitting groove lies in the plane of the cutting edge.

10. The drill insert of claim 9, wherein the trailing portion of each chip splitting groove forms a second cutting edge.

11. The drill insert of claim 1, wherein the drill insert body has at least two cutting edges inclined downwardly and outwardly from a center toward both side edges, wherein each cutting edge has at least one chip splitting groove formed transverse to the cutting edge.

12. A drilling tool assembly comprising:
    a holder having a shank portion and a head portion, the head portion having a recess formed on one end thereof;
    a drill insert body, receivable in said recess, having at least two cutting edges inclined downwardly and outwardly from a center toward both side edges;
    wherein each cutting edge has at least one chip splitting groove formed transverse to the cutting edge;
    wherein the chip splitting groove is formed at a negative rake angle.

13. The drilling tool assembly of claim 12, wherein the drill insert body further comprises a self-centering multi-faceted chisel point.

14. The drilling tool assembly of claim 12, wherein the chip splitting groove is formed at a negative rake angle selected from the group consisting of 10–30 degrees and 65 to 85 degrees.

15. The drilling tool assembly of claim 12, wherein the drill insert body is comprised of a sintered metallic hard material.

16. The drilling tool assembly drill insert of claim 12, wherein the drill insert body is comprised of a material selected from the group consisting of carbide, cermet, ceramic, monocrystalline and polycrystalline diamond, and boron nitride.

17. The drilling tool assembly of claim 12, wherein the drill insert body is comprised of high speed steel.

18. The drilling tool assembly drill insert of claim 12, wherein the chip splitting groove has a cross-sectional geometry in the form of a continuous radius.

19. The drilling tool assembly drill insert of claim 12, wherein the chip splitting groove has a cross-sectional geometry in the form of a radius at the apex of the groove and transitioning to straight side walls toward the cutting edge of the insert.

20. The drilling tool assembly drill insert of claim 12, wherein the drill insert body further comprises at least one clearance surface trailing each cutting edge such that a trailing portion of the chip splitting groove lies in the plane of the at least one clearance surface and a leading portion of the chip splitting groove lies in the plane of the cutting edge.

21. The drilling tool assembly of claim 20, wherein the trailing portion of each chip splitting groove forms a second cutting edge.

* * * * *